Nov. 24, 1953

S. BERTRAM 2,660,691

SWEEP CIRCUIT

Filed Aug. 17, 1944

INVENTOR.
SIDNEY BERTRAM
BY
ATTORNEY

INVENTOR.
SIDNEY BERTRAM

Nov. 24, 1953  S. BERTRAM  2,660,691
SWEEP CIRCUIT
Filed Aug. 17, 1944  3 Sheets-Sheet 3

INVENTOR.
SIDNEY BERTRAM
BY
ATTORNEY

Patented Nov. 24, 1953

2,660,691

UNITED STATES PATENT OFFICE 2,660,691

SWEEP CIRCUIT

Sidney Bertram, Los Angeles, Calif.

Application August 17, 1944, Serial No. 549,876

11 Claims. (Cl. 315—24)

This invention relates to a radial sweep circuit of the type used in controlling the sweep of the spot on an oscilloscope screen.

New developments in the field of radio and sound detection have raised corresponding problems with respect to means and methods of indication. Systems are now in use which provide information with respect to the presence and position of targets or objects at all ranges and bearings simultaneously. One of the objects of the present invention is a means and method of accurately portraying this information on the screen of a CRO (cathode-ray oscilloscope).

The existing means of portrayal which plot bearings along one Cartesian coordinate axis and ranges along the other have been found lacking in that no true representation of the scanned area is presented. The present invention portrays any and all objects present within the range of the wave receiver or transducer at ranges and bearings, measured from a reference point (which corresponds to the position of the transducer), in their proper relative positions, i. e., the screen is effectively a small scale map of the area.

In order that this type of portrayal may be accomplished, the spot is made to trace a radial line on the screen in a direction corresponding to the direction in which the receiving transducer is trained. Means are also provided to vary the angle made by the radial trace with a fixed axis on the screen. The intensity of the spot is modulated in any convenient manner.

One specific use for which the present invention has proved very useful is in connection with echo-ranging systems. In this case, as before, the spot is arranged to trace a radial line in a direction corresponding to the direction of the receiving transducer by means of the use of a sine potentiometer (or any other convenient means). One such system, disclosed in an application for patent entitled, "Echo-Ranging System," Serial No. 520,667, filed February 1, 1944, by Charles A. Hisserich, obtains information for all ranges simultaneously. The scanned area is effectively divided into range bands which are represented by a series of corresponding frequency bands or channels at the output of the receiver. Some means such as the electronic switches disclosed in my applications for patents, entitled "Multi-Channel Electronic Switch," Serial No. 532,915, filed April 26, 1944, and Serial No. 555,351, filed September 22, 1944, are used to successively and rapidly apply these frequency bands to the Z-axis or intensity amplifier to modulate the spot on the CRO. The present invention enables the application of each of the frequency channels (in proper order) to the CRO intensity amplifier once during each radial sweep of the spot. In other words, as the spot sweeps radially, each of the channels, starting with the lowest frequency channel (short range) and ending with the high frequency channel (long range), is connected to modulate the spot.

Figure 1:
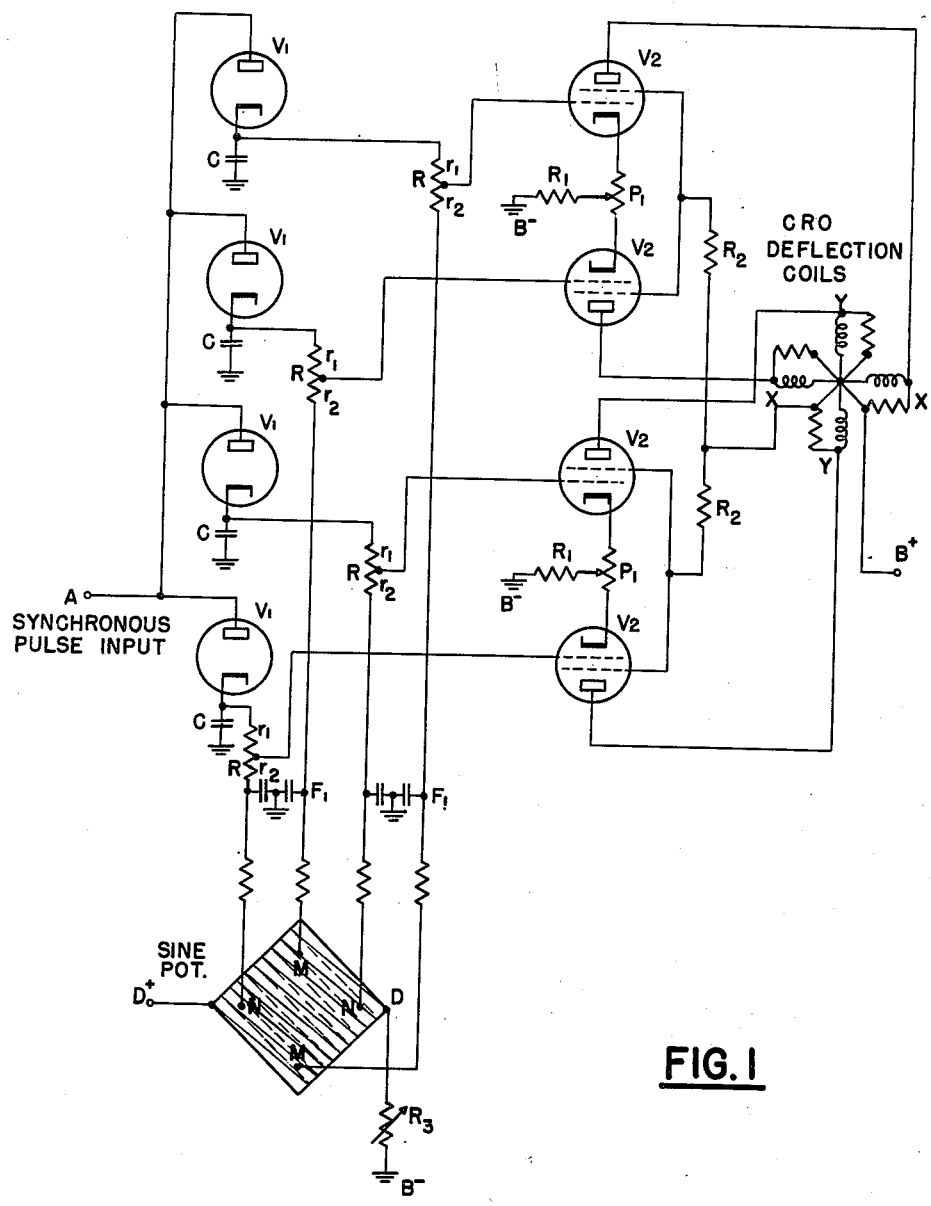
Figure 1 is a schematic diagram of the invention.

In Fig. 1, a synchronizing pulse, which should preferably be one of high amplitude and steep positive slope, is applied to the circuit at terminal A at the proper time, as determined by the associated circuits with which the invention is used. This pulse is supplied to drive the plates of four sawtooth generators (diodes) $V_1$ to a high positive voltage. Because of the low resistance of these tubes (when the plate is positive with respect to cathode), their cathodes rise in potential with the plates and in so doing charge the corresponding condensers C in the cathode circuits. At the end of the pulse, the four plates are carried in a negative direction and the cathodes float free. The condensers in the cathode circuits are thus caused to discharge through connecting resistors R. The rate of discharge is proportional to the difference between the initial voltage $E_c$ on one of the cathodes and the voltage on the corresponding one of the contacts or terminals M (or N) on the sine potentiometer.

The voltage variations at terminals M and N are proportional to the sine and cosine of the angle desired to be portrayed on the CRO. These may be obtained from any convenient source, one of which, called a "sine potentiometer," is illustrated schematically in Fig. 1. Such a device consists of a plate or card uniformly wound with a conductor across which a voltage is applied, as between terminals D, D. Two pairs of contacts M, N, fixed at 90° with respect to each other, are provided for rotation about the center of the card and arranged to be in contact with the conductor at all times. Thus, as the contacts M, N are rotated, they take from the conductor voltages proportional to the sine and cosine of the angle $\theta$ which they make with a reference line on the card or plate and apply them through filters $F_1$ to resistors R.

With this arrangement it will be seen that the voltages, $e_{x_1}$ and $e_{x_2}$, across the two condensers C associated with the upper pair of tubes $V_1$ may be written $$e_{x_1} = E_c - (1 - e^{-t/RC})\left[E_c - \frac{E_s}{2}(1 - \sin \theta)\right]$$

and $$e_{x_2} = E_c - (1 - e^{-t/RC})\left[E_c - \frac{E_s}{2}(1 + \sin \theta)\right]$$

where $E_s$ is the voltage across terminals D, R is the value of resistors R, C is the capacitance of condensers C, and $t$ is the time measured from the end of the pulse applied at terminal A. For convenience, these voltages will be assumed to be related to the X-axis deflection coils (or plates) of the CRO.

The cathodes of the tubes $V_1$ are connected through a portion $r_1$ of tapped resistors R to the grids of the driver tubes $V_2$. The driver tubes are arranged in two pairs with the cathodes of the tubes (comprising the pairs) tied together through small potentiometers $P_1$, provided as centering adjustment means. The center arms of the potentiometers $P_1$ are returned to B— potential through resistors $R_1$. The screen grids of the driver tubes are connected to B+ through resistors $R_2$, while the plates are connected to the respective X- and Y-axis terminals X, X and Y, Y on the deflection coils of the CRO. It is seen that the driver tubes are arranged to be highly degenerative to signals fed in parallel so that only the difference between voltages applied to the two grids (of a pair) is effective in producing current flow in the deflecting coil. This difference, as measured at the discharge condensers C is $e_{x_2} - e_{x_1} = E_s(1 - e^{-t/RC}) \sin \theta$ or, approximately $$e_{x_2} - e_{x_1} = \left(\frac{E_s \sin \theta}{RC}\right) t$$

where it is assumed that RC is taken large compared to the repetition period, as determined by the synchronizing pulse rate.

The corresponding expression for the voltage difference between the Y-axis discharge condensers is $$e_{y_2} - e_{y_1} = \left(\frac{E_s \cos \theta}{RC}\right) t$$

It is thus seen that the two pairs of driver tubes supply currents to the X- and Y-axis deflection coils which are proportional to the sine and cosine of the angle $\theta$. Each time a pulse is applied to the circuit at terminal A, the spot on the CRO will trace a line on the screen, in a direction which makes the angle $\theta$ with the Y-axis on the screen, as determined by the setting of the sine potentiometer. As the contact arms, with terminal M, M and N, N on the sine potentiometer moved to a new position, the spot will be caused to trace a line at a new angle with respect to the Y-axis.

The particular point on resistors R at which the grids of the driver tubes are tapped is also of importance in determining the kind of line which the spot will be caused to trace. If the grids of the driver tubes are connected directly to the discharge condensers C (i. e., $r_1 = 0$), the CRO spot will trace a radial line on the screen starting from the center of the circle (at $t = 0$) and extending outwardly at an angle $\theta$ measured with respect to the Y-axis, since the above equations are the parametric representation of such a line. The radial position of the spot at any time is proportional to $$\sqrt{(e_{x_2} - e_{x_1})^2 + (e_{y_2} - e_{y_1})^2} = \frac{E_s t}{RC}$$

In many applications, it may be desirable not to have the spot trace to the center, but to have it trace from a certain defined distance out from the center. This is accomplished by tapping the grids off resistor R at a point such that $r_1$ has an appreciable value. The desired position of the tap is readily found by noting that connection to the top of R gives a spot that moves out from the center with maximum amplitude proportional to $$\frac{E_s t_{max}}{RC}$$

(as controlled by variable resistor $R_3$), where $t_{max}$ is the time between the end of one pulse and the beginning of the next. Connection at the bottom of R gives a stationary spot with a position which corresponds to the voltage $E_s$ across the sine potentiometer. Thus, for any tapped point the length of the line traced $$\alpha \left(\frac{r_2}{r_1 + r_2}\right) E_s \frac{t_{max}}{RC}$$

and the radius of starting point from center $$\alpha \left(\frac{r_1}{r_1 + r_2}\right) E_s$$

Although the invention described above may be used wherever it is necessary to provide a radial sweep on a CRO, it has been found to be particularly adaptable to presenting information in systems of the type described in a patent application entitled, "Echo-Ranging System" and identified above. The system described in such application provides information in a plurality of filter channels, the outputs of which are rapidly scanned by an electronic switch. The present invention is thus utilized to present the information present in the various channels in their relative positions on the CRO screen. As the successive channels contain information about successive range bands, it is desirable to connect the channels as to successively modulate the spot as it moves radially on the screen. In this manner, the trace accurately portrays the information at all ranges encompassed by the filter channels. If the angle $\theta$ made by the trace (as measured from the Y-axis on the screen) is synchronized with the receiving transducer, the center of the screen represents the position of the transducer and the trace of the spot accurately portrays the area scanned by the transducer.

Switches for accomplishing the successive connection of the channels to the intensity amplifier of the CRO are disclosed in my two copending patent applications, identified above. In each of these disclosures is shown a source of alternating voltage and a phase-shifting network which, with the associated tube circuits, is caused to successively apply the outputs of various channels to an output terminal. It is apparent that the present invention, when synchronized with such a switch, enables an accurate portrayal of the information in the filter channels.

Figure 2:
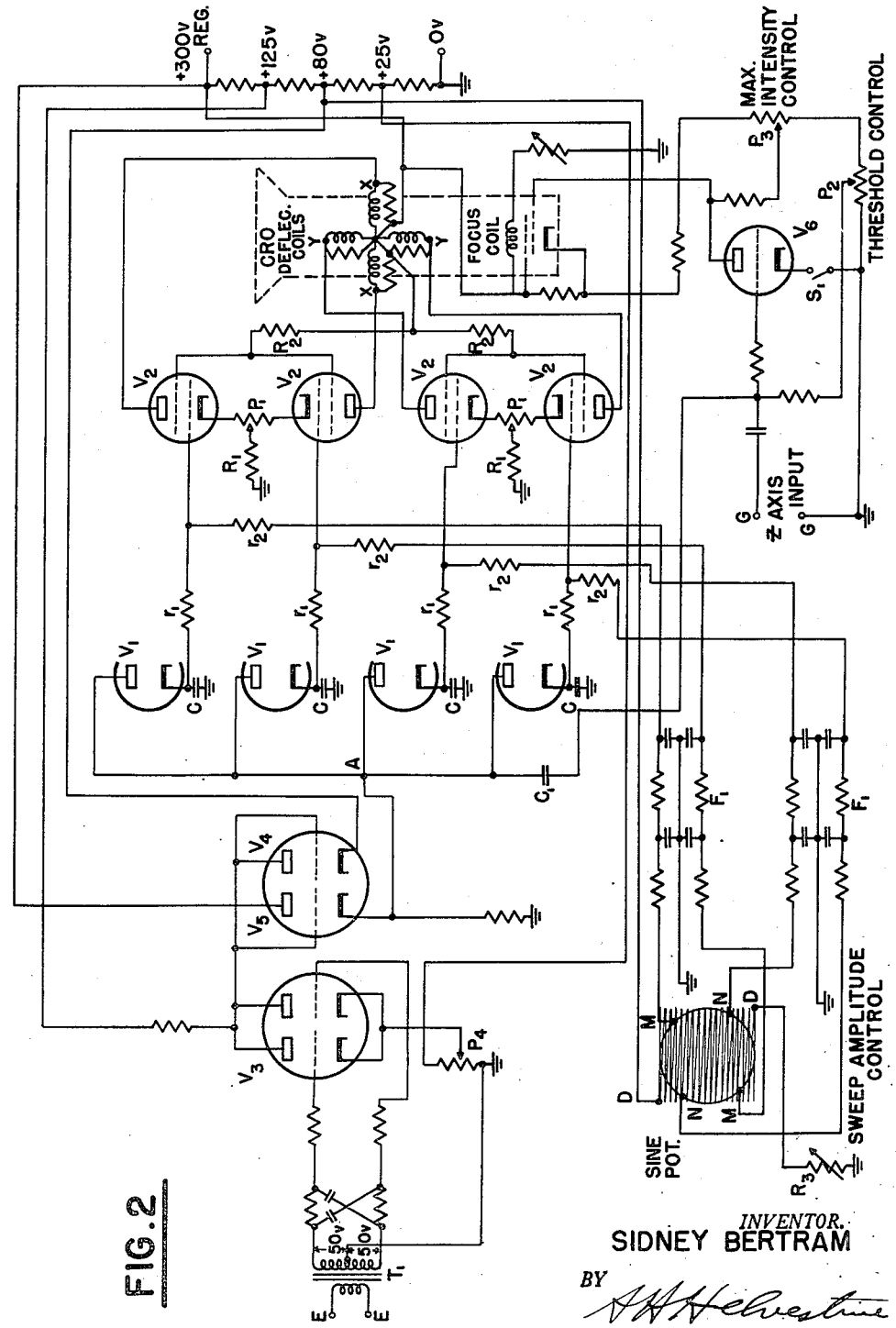
Figure 2 is a schematic diagram of the invention showing its use with an electronic switch.

Figure 2 is a schematic diagram showing the invention as used with a switch of the type disclosed in the last-mentioned application (the circuit values being suitable for the system which is also disclosed in the application for patent on an Echo-Ranging System identified above). The same source of alternating potential applied to terminals shown in Fig. 2 of the latter of my copending applications (identified above) is applied to terminals E, E shown in Fig. 2 hereof. This voltage is in turn supplied to transformer $T_1$ whose secondary feeds a pulse generator $V_3$, through a phase-shifting network $F_2$. This network is arranged to supply voltages of opposite polarity to the two grids of tube $V_3$ and to insure that the pulse is applied to terminal A of the sweep circuit at the proper time in the switching cycle of the electronic switch. This would normally be chosen to occur during the unused portion of the switching cycle so that the spot on the CRO screen is caused to travel out on a radius (whose angular position is determined by the setting of the sine potentiometer) once during every switching cycle. It will be obivous that when the invention is used with the electronic switch, another section could be added to its phase-shifting network, in which case the network $F_1$ of Fig. 2 could be completely eliminated.

The plates of $V_3$ are connected in parallel through a high-resistance load. The bias on the tube is adjusted so that the triodes are both cut off when the sinusoidal component of the grid voltage is near zero, but so that on either side of the zero voltage point, one or other of the triode sections becomes conducting, lowering the plate voltage and the voltage at the grid of tube $V_4$. The output of the pulse generator $V_3$ is limited by a diode $V_4$ (which accurately defines the positive peak amplitude of the pulse) and its output is applied to a cathode-follower tube $V_5$ which drives the sawtooth generators $V_1$.

In the application for patent on an Echo-Ranging System, identified above, it was stated that the Z-axis (intensity) was controlled by an amplifier designated the Z-axis or intensity amplifier 16. When the present invention is utilized in that system, such an amplifier may comprise the elements shown in Fig. 2.

The switch output is applied to terminals G, G of Fig. 2 to modulate the intensity of the spot. The amplifier $V_6$ is arranged to be insensitive to signals below a pre-set level. Above this point, there is a very narrow region in which the illumination increases with input level; but this region is soon passed as the level increases and the beam intensity is limited at a pre-set maximum. This type of indication has proved experimentally to reduce the effect of background noise and is essentially on-off in character.

As shown in Fig. 2, positive bias, controllable with potentiometer $P_2$, is applied to the amplifier grid through a current limiting resistor. This makes the amplifier insensitive to signals of lower amplitude than the pre-set value. For input signals (negative pulses) that are silghtly more than (say 3 volts) this bias level, the amplifier tube cuts off and maximum voltage is applied to the grid of the CRO. A potentiometer $P_3$, together with a push button $S_1$ which opens the cathode circuit, provide means for adjusting the maximum intensity. The amplifier is connected to the CRO in a conventional manner.

For convenience, the whole circuit may be supplied from a tapped regulated voltage supply, as shown in Fig. 2.

The sine potentiometer shown in Fig. 2, when used with the echo-ranging system discussed above, would be connected such that its rotating member would be revolved synchronously with the wave receiver or transducer. This synchronous motion could be accomplished by a direct connection (or any convenient electrical or mechanical means) and the spot on the CRO screen would thus be caused to trace a line whose angle $\theta$ (measured from the Y-axis) would be equal to that made by the axis of the transducer beam with a reference direction (dead ahead, if mounted on a ship).

Figure 3:
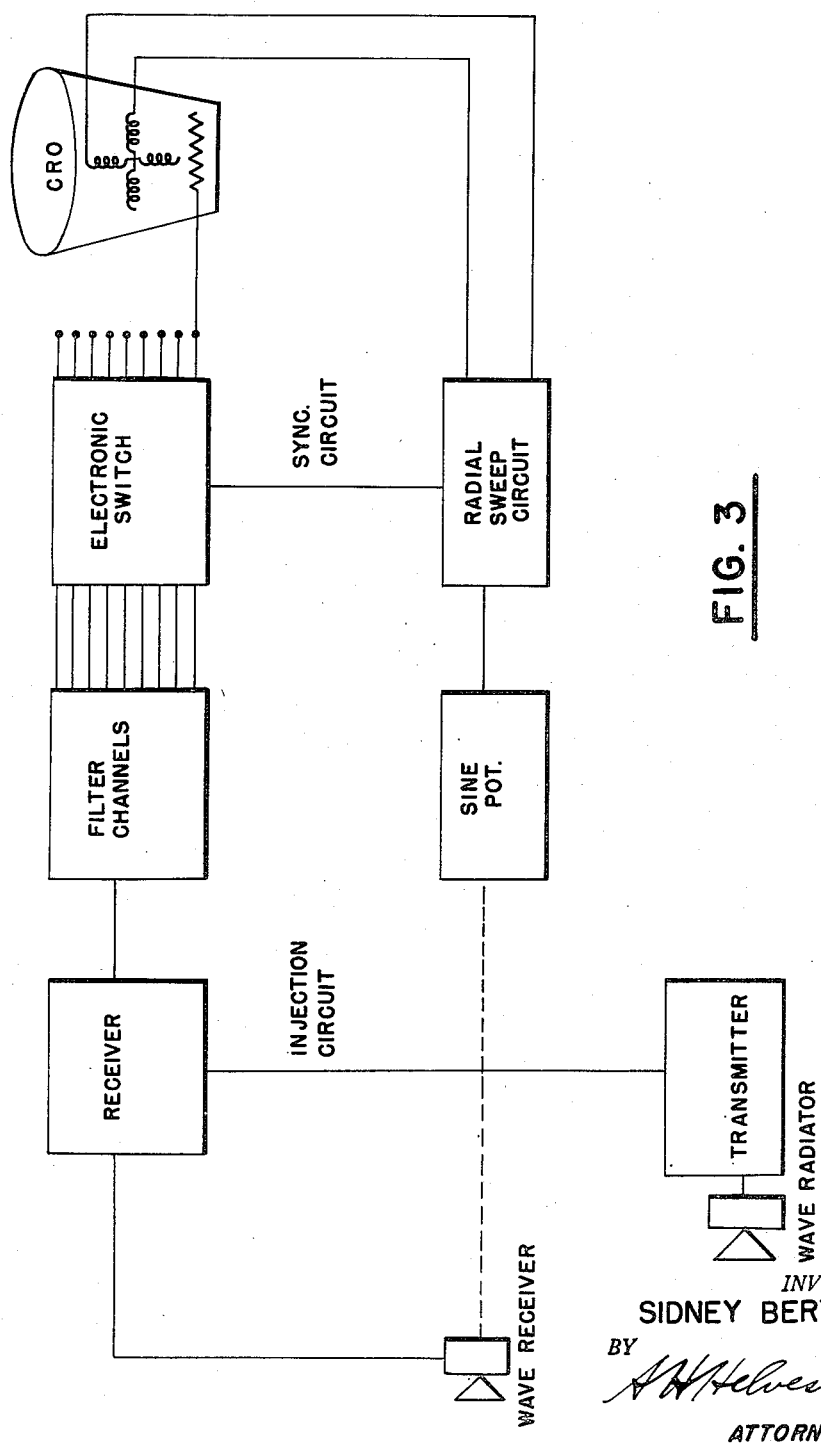
Figure 3 is a schematic block diagram of an echo-ranging system including the invention.

Such a complete system is shown in Fig. 3. The receiver, transmitter (power amplifier and sawtooth-modulated oscillator), wave radiator, wave receiver, and filter channels are the same as those shown in Fig. 5 of the patent application on an "Echo-Ranging System," and the electronic switch is of the type disclosed in my copending applications, all identified above.

The sine potentiometer is connected directly to the wave receiver and moves synchronously with it, as indicated by the dotted line. The sine potentiometer applies voltages to the radial sweep circuit whose operation is synchronized with the operation of the electronic switch. The sweep circuit controls the deflection coils and the output of the filters (controlled by the switch) is applied to modulate the spot (through a Z-axis amplifier).

For most effective operation, the phase-shifting network should comprise several more sections than there are filter channels, in order that one or more may be used for the CRO spot flyback. For example, with a 10-channel filter and switch, an 11-section phase-shifting network could be used, and the outward sweep of the spot would effectively be divided into ten parts, each one of which would correspond to a filter channel. The remaining section would be used for the flyback.

In this connection it may also be desirable to include still another (a twelfth, in the above example) section in the phase-shifting network. If this is done, and a small condenser $C_1$ is connected between terminal A and the Z-axis amplifier input terminals G, G (as shown in Fig. 2), the negative swing at the conclusion of the pulse applied at terminal A will cause a brightening of the spot. Thus, there is a bright spot immediately after the flyback which, as the sine potentiometer is rotated, will trace a circle (with a radius determined by the value of $r_1$) around the center of the CRO, independent of whether signals are being received or not. This same brightening is then used to indicate the bearing at which the transducer is trained at any instant.

The system thus described presents on the screen of the CRO a plot of the area scanned by the wave receiver and objects within the area will be indicated (by a brightening of the spot) in their proper relative positions on the screen, as determined by the setting of the sine potentiometer (bearing) and by the particular channel carrying the returning signal (range). As the wave receiver is rotated, the direction of the radial sweep changes correspondingly; and as objects reflect signals from various ranges, they are indicated as a brightening of the spot at the proper point (as determined by the channel carrying the signal) in the radial sweep. The use of a long-persistence screen on the CRO makes possible simultaneous visual indication of all the objects present in the scanned area. Any desired scanning procedure may be adopted.

Having described my invention, I claim:

1. A sweep circuit comprising: first means for obtaining two voltages, each proportional to some function of an angle; second means for establishing a reference voltage; two condensers; third means for intermittently charging said condensers to said reference voltage; two discharge resistors; means for applying each of said two voltages to a respective one of said condensers through a respective one of said resistors; means for obtaining the difference between the voltages across said two resistors; means for applying said difference between said voltages to an indicator.

2. In the device described in claim 1, said first means comprising a sine potentiometer.

3. In the device described in claim 1, said third means comprising a pair of diodes.

4. A sweep circuit comprising: first means for obtaining two voltages, each proportional to some function of an angle; second means for establishing a reference voltage; two condensers; third means for intermittently charging said condensers to said reference voltage; two discharge resistors; means for applying each of said two voltages to a respective one of said condensers through a respective one of said resistors; means for obtaining the difference between the voltages across said two resistors; means for applying said difference between said voltages plus a portion of the difference between said voltages proportional to said function to an indicator.

5. A sweep circuit comprising: first means for obtaining two pairs of voltages, each of said voltages proportional to some function of an angle; second means for establishing a reference voltage; two pairs of condensers; third means for charging said condensers to said reference voltage; two pairs of discharge resistors; means for applying each of said voltages of said two pairs of voltages to a respective one of said condensers through a respective one of said resistors; means for obtaining the differences between the voltages across the said resistors of each of said pairs of resistors; means for applying said differences to an indicator.

6. In the device described in claim 5, said first means comprising a sine potentiometer.

7. In the device described in claim 5, said third means comprising two pairs of diodes.

8. A sweep circuit comprising: first means for obtaining two pairs of voltages, each of said voltages proportional to some function of an angle; second means for establishing a reference voltage; two pairs of condensers; third means for charging said condensers to said reference voltage; two pairs of discharge resistors; means for applying each of said voltages of said two pairs of voltages to a respective one of said condensers through a respective one of said resistors; means for obtaining the differences between proportional portions of the voltages across said resistors of each of said pairs of resistors; means for applying said differences to an indicator.

9. In the device described in claim 8, said first means comprising a sine potentiometer.

10. A sweep circuit comprising: first means for obtaining two pairs of voltages, each of said voltages proportional to some function of an angle; second means for establishing a reference voltage; two pairs of condensers; third means for charging said condensers to said reference voltage; two pairs of discharge resistors; means for applying each of said voltages of said two pairs of voltages to a respective one of said condensers through a respective one of said resistors; means for obtaining the differences between the voltages across the said resistors of each of said pairs of resistors; means for applying said differences to the respective deflection circuits of a cathode-ray oscilloscope.

11. In the device described in claim 10, said first means comprising a sine potentiometer.

SIDNEY BERTRAM.

References Cited in the file of this patent

UNITED STATES PATENTS

| Number | Name | Date |
| --- | --- | --- |
| 2,052,183 | Lewis et al. | Aug. 25, 1936 |
| 2,052,184 | Lewis | Aug. 25, 1936 |
| 2,151,917 | Hyland | Mar. 28, 1939 |
| 2,172,395 | McSpadden | Sept. 12, 1939 |
| 2,208,379 | Luck | July 16, 1940 |
| 2,237,604 | Marique | Apr. 8, 1941 |
| 2,275,974 | Mathes | Mar. 10, 1942 |
| 2,369,631 | Zanarini | Feb. 13, 1945 |